E. W. WILKINSON.
ORE CONCENTRATION.
APPLICATION FILED DEC. 31, 1918.

1,398,989.

Patented Dec. 6, 1921.
2 SHEETS—SHEET 1.

Inventor
Eltoft Wray Wilkinson
By his Attorneys
Williams & Pritchard

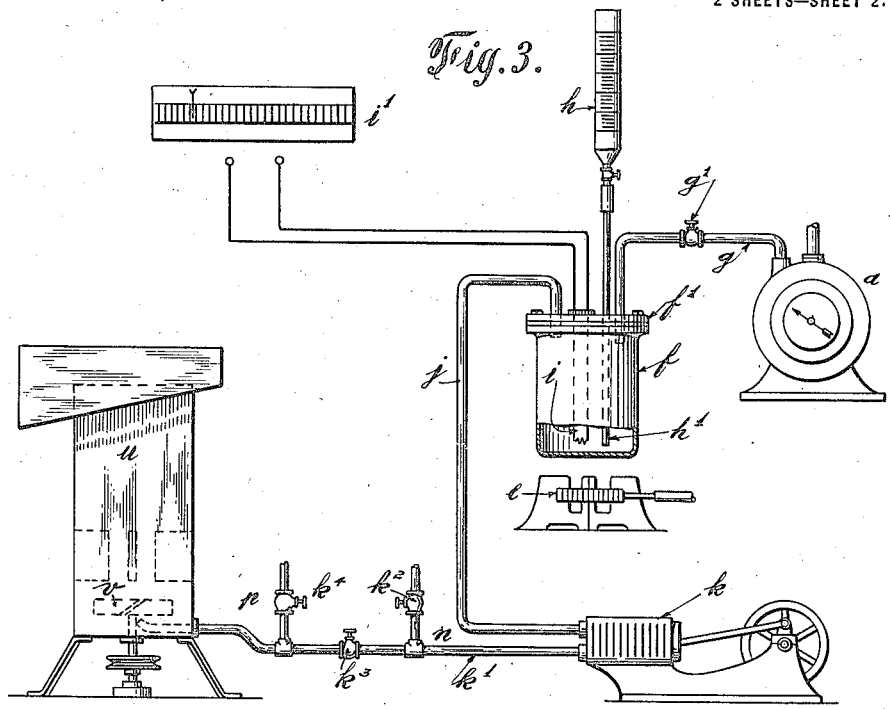
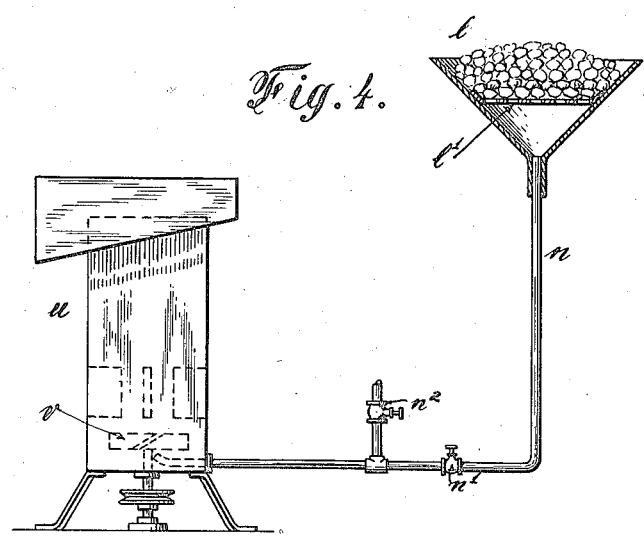

UNITED STATES PATENT OFFICE.

ELTOFT WRAY WILKINSON, OF SAN FRANCISCO, CALIFORNIA, ASSIGNOR TO MINERALS SEPARATION NORTH AMERICAN CORPORATION, OF NEW YORK, N. Y., A CORPORATION OF MARYLAND.

ORE CONCENTRATION.

1,398,989.   Specification of Letters Patent.   Patented Dec. 6, 1921.

Application filed December 31, 1918. Serial No. 269,107.

*To all whom it may concern:*

Be it known that I, ELTOFT WRAY WILKINSON, a subject of the King of Great Britain, and resident of the city of San Francisco, county of San Francisco, and State of California, have invented certain new and useful Improvements in Ore Concentration, of which the following is a specification.

My invention relates to processes for concentrating ores or similar substances wherein, or upon the grinding of which, there are mixtures of solid substances having different physical properties, by utilizing these differences and the property possessed by certain agents of forming a froth with water or other liquid, the bubbles composing which have the ability of selecting the solid substances of one or more of the different classes and rejecting the remainder. These processes are widely utilized in the concentration of ores and other mineral substances, and the agents are commonly termed mineral-frothing agents. This term is therefore used herein to describe such agents. The processes are generally known as froth flotation processes.

The present invention relates more particularly to the mineral-frothing agents used in these processes and is applicable to all the different methods of bringing into action the useful properties of the mineral-frothing agent, the solid substances to be separated, and the gaseous bubbles.

It is well known that although many organic substances are mineral-frothing agents, other organic substances are not mineral-frothing agents. I have found on subjecting an organic substance to partial decomposition or combustion in the presence of oxygen and under the action of heat that the products so formed are useful mineral-frothing agents. The organic substances used in my process may be originally a mineral-frothing agent (as for instance oleic acid) or may be a liquid incapable of acting as a mineral-frothing agent, as for instance certain petroleum products such as gas-oil and kerosene, or a solid such as wood, or other substances containing cellulose or other carbohydrates, or a bitumen or a substance containing bitumen, such as bituminous coal or solid materials yielding oil or hydrocarbons.

The organic substance is raised to a temperature sufficient to cause partial oxidation, which having started may, in some cases, produce the heat necessary to carry on the operation, although in other cases it may be found advisable to continue the application of external heat during the reaction.

When the organic substance submitted to this process is solid it is charged into a suitable vessel or container provided with one or more air or oxygen inlets and an exit pipe or conduit to carry the products to the apparatus (hereinafter termed the flotation machine) wherein it is mixed with the solid substances to be separated, water or other liquid, and air or other inert gas bubbles. In other cases where the organic substance is capable of being suitably divided (sawdust or oil for example) it may be raised to the requisite temperature by feeding it continuously, together with the necessary air or oxygen, to a heated region with suitable provision for removing the products formed.

The proportion of air or oxygen to the organic substance depends largely on the nature of the latter, on the yield and nature of the products desired, and on the temperature at which the chemical reactions proceed.

I shall now particularly describe examples of the carrying out of my invention with reference to the accompanying drawings, which illustrate forms of apparatus that may be used in carrying out my invention, and shall thereafter point out my invention in claims.

Fig. 3 is a diagrammatic view of an apparatus for the treatment of gas-oil, and the utilization of the products thereof in froth flotation.

Fig. 4 is a diagrammatic view of an apparatus for the treatment of kerosene-saturated material or bituminous coal, and the utilization of the products thereof in froth flotation.

Figure 1:
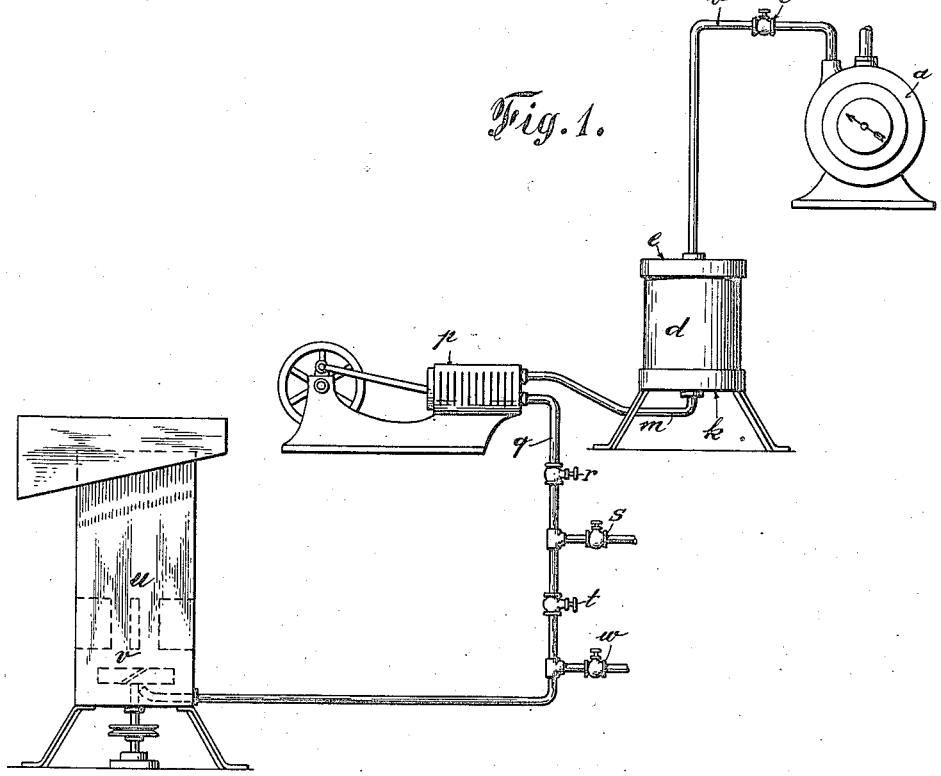
Figure 1 is a diagrammatic view of an apparatus for the treatment of wood, and the utilization of the products thereof in froth flotation.
Figure 2:
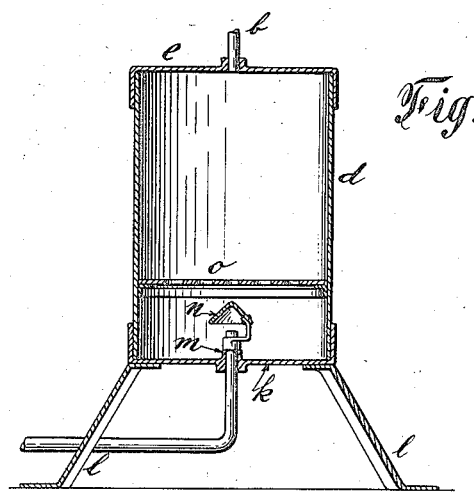
Fig. 2 is an enlarged vertical section of the stove used in such treatment.

I will first describe the apparatus shown in Figs. 1 and 2. Here *a* is a gas meter which measures the amount of air admitted to the stove *d* through a small tube *b* under the control of a valve *c* in the tube *b*. The tube *b* enters the cover *e* of the stove, which is removable for insertion of the charge. A grate *o* is provided near the bottom of the stove and may be formed as shown by perforated sheet metal. The stove is supported by legs *l*. A pipe *m* fitted with a small hood *n* to protect its opening from falling ashes, etc., is located beneath the grate and extends out through the bottom *k* of the stove. This pipe *m* passes to an air pump *p*. The outlet pipe *q* of this air pump is led into the bottom of a laboratory subaeration flotation machine *u* wherein agitation is effected by the impeller *v*. The pipe *q* is provided with two valved branches *s* and *w*, and between these valved branches there is a valve *t*, and in advance of the first of the valved branches a valve *r*.

The following is an example of the carrying out of this invention with the wood, yellow pine (*Pinus echinata*). This wood is broken up into chips, say an inch long by three-sixteenths diameter, and 100 grams of these chips are placed in the upper part of this stove *d*. The air pump *p* is started with the valves *c*, *r* and *s* open and the valves *t* and *w* closed. The pine chips are ignited and the cover of the stove quickly replaced, so that the air for combustion will be supplied only by the suction of air through the gas meter *a* resulting from the action of the air pump. The products pass out of the circuit at the exhaust valve *s* of the air pump *p*. While the action in the stove *d* is thus set going, a charge is made up in the flotation machine *u*, consisting of 700 grams of Butte & Superior zinc ore from Butte, Montana, ground to pass through 80 mesh Tyler standard screen, to which is added cold tap water to produce a pulp of the density of 4½ parts of water to 1 of ore. This pulp is acidified with 25 pounds per ton (of 2000 lbs.) of ore, of commercial sulfuric acid, and there is added one pound per ton of copper sulfate. The flotation machine is started to run at about 1800 R. P. M. The valve *s* is closed, the valve *t* opened, so that the products of the reactions in the stove *d* pass directly from the pump *p* into the flotation machine *u*. These products are thus fed into the flotation machine for 65 seconds, which suffices to charge the pulp with frothing agent and prepare it for the admission of air. The valves *s* and *w* are then opened and the valve *t* closed, so that the impeller now sucks air through the valve *w* while the products of the reactions in the stove again pass out through the valve *s*, and obviously may be supplied to other flotation machines not shown.

Excellent flotation conditions are obtained in the flotation machine by continued agitation with the admission of air as above described for a period of sixteen minutes.

The wood in the stove *d* is consumed at an average rate of 2.94 grams per minute, and is supplied with air at the rate of 6.5 liters per minute, so that for one gram of wood 2.86 grams of air are supplied. In the 65 seconds during which the products of the reactions are fed directly into the flotation machine *u*, 3.81 grams of wood, or 9.1 pounds of wood per ton (of 2000 lbs.) of ore are used.

The froth produced in the flotation machine is a strong self-discharging froth, and upon collection as a concentrate it was weighed and assayed, as were the residues left in the machine. The metallurgical results of this test were as follows:

| Products. | Weight %. | Assays %. | | Percentage of total Zn. |
|---|---|---|---|---|
| | | Zn. | Insols. | |
| Heads | 100.00 | 12.93 | | 100.00 |
| Concentrates | 27.6 | 42.40 | 19.5 | 90.5 |
| Tailings | 72.4 | 1.70 | | 9.5 |

I will now describe the apparatus shown in Fig. 3 adapted for carrying out the invention with gas-oil. Here *a* is a gas meter which measures the amount of air admitted to a retort *f* through a small tube *g*. This retort is heated by a ring burner *e*. It comprises a copper cylinder permanently closed at the bottom and having a lid $f^1$ bolted to a flange at the top. The small tube *g* from the gas meter *a* has a regulating valve $g^1$ therein and enters the retort through an opening in the lid $f^1$ and terminates near the top of the retort. The material to be treated is supplied to the retort through a burette *h* from which a tube $h^1$ extends down through the lid $f^1$ and terminates near the bottom of the retort. A thermo-couple *i* is arranged in the retort near the bottom thereof and is connected by wires passing through the lid $f^1$ to a voltmeter $i^1$, the thermo-couple and voltmeter constituting a pyrometer for indicating the temperature maintained at the lower part of the retort. A tube *j* extends from the top of the retort through the lid and carries off the products. All of these tubes and wires make tight joints with the lid. The tube *j* leads to an air pump *k*, the outlet pipe $k^1$ of which enters the bottom of a laboratory subaeration flotation machine *u* provided with an impeller *v*.

To start the operation the retort *f* is heated by the gas burner *e* until the pyrometer *i*, $i^1$ records about 1000° Fahrenheit, then the pump *k* is started, and a valve $k^2$ on a branch of the pump outlet pipe $k^1$ is opened, and a valve $k^3$ farther along in that pipe is closed, so that the pump exhausts freely to the air. Paraffin gas-oil obtained from the Texas Company is allowed to run from the burette $h$ through the pipe $h^1$ to the heated zone at the bottom of the retort $f$ at a rate of flow of 2.48 cc. per minute. The valve $g^1$ is opened so that air is admitted to the retort through the meter $a$ and the pipe $g$ at the rate of 5.76 liters per minute. The pump now exhausts the products past the valve $h^2$, either to waste or for storage. The temperature in the heated zone is maintained within a few degrees of 1032° F.

In the flotation machine $u$ a pulp is made up of 700 grams of Butte & Superior zinc ore from Butte, Montana, ground to pass through 80 mesh Tyler standard screen, which is mixed with cold tap water to a pulp density of about 4.5 parts of water to 1 of ore. This pulp is acidified with 25 pounds of sulfuric acid per ton (of 2000 lbs.) of ore, and there is added copper sulfate in the proportion of 1 pound per ton (of 2000 lbs.) of ore. The impeller $v$ of the flotation machine is started to run at about 1800 R. P. M. The valve $h^3$ is opened and the valve $h^2$ and another valve $h^4$ on a branch of the pump outlet pipe between the valve $h^3$ and the flotation machine, are closed, so that the products of the reactions in the retort $f$ pass into the pulp in the flotation machine $u$. After 45 seconds the valves $h^2$ and $h^4$ are opened, the valve $h^3$ is closed, so that the products of the reactions again pass out through the valve $h^2$ to storage, waste, or for the operation of other flotation machines, while air is sucked into the flotation machine, and the operation under these conditions is continued for about 25 minutes.

An excellent self-discharging froth is formed in the flotation machine $u$ and is collected continuously. Upon weighing and assaying it as a concentrate and the residues as tailings the following metallurgical results were obtained:

| Products. | Weight %. | Assays % zn. | Percentage of total zn. |
|---|---|---|---|
| Heads | 100.0 | 14.8 | 100.0 |
| Concentrates | 31.6 | 44.0 | 94.0 |
| Tailings | 68.4 | 1.3 | 6.0 |

I will now describe the apparatus shown in Fig. 4, which is a very simple form of apparatus adapted for carrying out this invention with kerosene-saturated material or bituminous coal. A metal funnel $l$ is fitted with a supporting grate consisting of a screen $l^1$ of perforated metal. The funnel connects at its lower end through a pipe $n$ to the bottom of the laboratory subaeration flotation machine $u$, having an impeller $v$. In the pipe $n$ there is a valve $n^1$, and beyond it another valve $n^2$ on a branch of the pipe.

In treating kerosene in this apparatus I prefer to saturate a suitable fire-resisting porous material such as brick, with the kerosene, and break up the saturated brick into small pieces, say within a half inch cube. The kerosene which I have used was obtained from the Standard Oil Company of California and known by the trade name of "Eocene."

In the flotation machine $u$ a pulp is made up of 800 grams of copper ore of the Swansea Lease mine of Arizona, which is mixed with cold tap water to a pulp density of about 4 parts of water to 1 of ore, and to the pulp is added 2 pounds of sodium silicate per ton (of 2000 lbs.) of ore. The valve $n^2$ is closed with the valve $n^1$ opened after the machine has been started at about 1800 R. P. M. The kerosene on the crushed brick is ignited, burning with a smoky flame. The suction induced by the impeller $v$ of the flotation machine $u$ draws the products of the combustion of the kerosene through the grate $l^1$ and pipe $n$ into the pulp in the flotation machine $u$, and this is continued for fifteen minutes, and then the valve $n^1$ is closed and the valve $n^2$ opened, so that air is sucked into the flotation machine, and this is continued for five minutes more, the total agitation being twenty minutes.

A good self-discharging froth was formed, which was collected, weighed and assayed as concentrate, the residues being weighed and assayed as tailings, with the following metallurgical result:

| Products. | Weight %. | Assays % Cu. | Percentage of total Cu. |
|---|---|---|---|
| Heads | 100.0 | 2.84 | 100.0 |
| Concentrates | 21.3 | 11.30 | 85.0 |
| Tailings | 78.7 | 0.52 | 15.0 |

In using this apparatus shown in Fig. 4 with bituminous coal the coal used was ordinary soft coal obtained on the market in San Francisco, California.

In the flotation machine $u$ a pulp was made up of 700 grams of copper ore from the Engels mine of California, and this was mixed with cold tap water to a pulp density of about $4\frac{1}{2}$ parts of water to 1 of ore. The operation was substantially as above described relative to kerosene-saturated material. The products of combustion in the funnel $l$, with some excess of air, was sucked by the action of the impeller into the flotation machine for twenty minutes, and thereafter air alone was admitted for five minutes as heretofore described.

An excellent self-discharging froth was formed and collected continuously, and weighed and assayed as concentrate, while the tailings were also weighed and assayed, with the following metallurgical result:

| Products. | Weight %. | Assay % copper. | Percentage of total Cu. |
| --- | --- | --- | --- |
| Heads | 100.0 | 4.48 | 100.0 |
| Concentrates | 14.5 | 26.00 | 83.6 |
| Tailings | 85.5 | 0.86 | 16.4 |

Ordinary commercial operations with re-treatments of the concentrates would in each instance produce a higher grade of concentrate and an improved recovery. Obviously the nature and arrangement of the apparatus would be varied to suit the requirements of different installations and best carry out in each case the process constituting this invention.

I claim:

1. The process of concentrating ores which consists in subjecting an organic substance to partial decomposition in the presence of free oxygen and flowing the mixed volatilized products of such operation into and mixing them with an ore pulp and also mixing a gas with the ore pulp so as to produce mineral-bearing froth, and separating the froth.

2. The process of concentrating ores which consists in subjecting a carbohydrate to partial decomposition in the presence of free oxygen and flowing the mixed volatilized products of such operation into and mixing them with an ore pulp and also mixing a gas with the ore pulp so as to produce mineral-bearing froth, and separating the froth.

3. The process of concentrating ores which consists in subjecting wood to partial decomposition in the presence of free oxygen and flowing the mixed volatilized products of such operation into and mixing them with an ore pulp and also mixing a gas with the ore pulp so as to produce mineral-bearing froth, and separating the froth.

4. The process of concentrating ores which consists in subjecting an organic substance to partial decomposition in the presence of air and flowing the mixed volatilized products of such operation into and mixing them with an ore pulp and also mixing a gas with the ore pulp so as to produce mineral-bearing froth, and separating the froth.

5. The process of concentrating ores which consists in subjecting a carbohydrate to partial decomposition in the presence of air and flowing the mixed volatilized products of such operation into and mixing them with an ore pulp under such conditions as to produce mineral-bearing froth, and separating the froth.

6. The process of concentrating ores which consists in subjecting wood to partial decomposition in the presence of air and flowing the mixed volatilized products of such operation into and mixing them with an ore pulp under such conditions as to produce mineral-bearing froth, and separating the froth.

7. The process of concentrating ores which consists in subjecting an organic substance to a partially decomposing heat in the presence of free oxygen and flowing the mixed volatilized products of such operation into and mixing them with an ore pulp and also mixing a gas with the ore pulp so as to produce mineral-bearing froth, and separating the froth.

8. The process of concentrating ores which consists in subjecting a carbohydrate to a partially decomposing heat in the presence of free oxygen and flowing the mixed volatilized products of such operation into and mixing them with an ore pulp and also mixing a gas with the ore pulp so as to produce mineral-bearing froth, and separating the froth.

9. The process of concentrating ores which consists in subjecting wood to a partially decomposing heat in the presence of free oxygen and flowing the mixed volatilized products of such operation into and mixing them with an ore pulp and also mixing a gas with the ore pulp so as to produce mineral-bearing froth, and separating the froth.

10. The process of concentrating ores which consists in subjecting an organic substance to a partially decomposing heat in the presence of air and flowing the mixed volatilized products of such operation into and mixing them with an ore pulp and also mixing a gas with the ore pulp so as to produce mineral-bearing froth, and separating the froth.

11. The process of concentrating ores which consists in subjecting a carbohydrate to a partially decomposing heat in the presence of air and flowing the mixed volatilized products of such operation into and mixing them with an ore pulp under such conditions as to produce mineral-bearing froth, and separating the froth.

12. The process of concentrating ores which consists in subjecting wood to a partially decomposing heat in the presence of air and flowing the mixed volatilized products of such operation into and mixing them with an ore pulp under such conditions as to produce mineral-bearing froth, and separating the froth.

13. The process of concentrating ores which consists in subjecting an organic substance to partial decomposition in the presence of air and flowing the mixed volatilized products of such operation into an ore pulp and additionally flowing a gas into such ore pulp and disseminating such products and additional gas through the ore pulp so as to produce mineral-bearing froth, and separating the froth.

14. The process of concentrating ores which consists in subjecting a carbohydrate to partial decomposition in the presence of air and flowing the mixed volatilized products of such operation into an ore pulp and additionally flowing a bubble-forming gas into such ore pulp and disseminating such products and additional gas through the ore pulp so as to produce mineral-bearing froth, and separating the froth.

15. The process of concentrating ores which consists in subjecting wood to partial decomposition in the presence of air and flowing the mixed volatilized products of such operation into an ore pulp and additionally flowing a bubble-forming gas into such ore pulp and disseminating such products and additional gas through the ore pulp so as to produce mineral-bearing froth, and separating the froth.

16. The process of concentrating ores which consists in subjecting an organic substance to a partially decomposing heat in the presence of air and flowing the mixed volatilized products of such operation into an ore pulp and additionally flowing a bubble-forming gas into such ore pulp and disseminating such products and additional gas through the ore pulp so as to produce mineral-bearing froth, and separating the froth.

17. The process of concentrating ores which consists in subjecting a carbohydrate to a partially decomposing heat in the presence of air and flowing the mixed volatilized products of such operation into an ore pulp and additionally flowing a bubble-forming gas into such ore pulp and disseminating such products and additional gas through the ore pulp so as to produce mineral-bearing froth, and separating the froth.

18. The process of concentrating ores which consists in subjecting wood to a partially decomposing heat in the presence of air and flowing the mixed volatilized products of such operation into an ore pulp and additionally flowing a bubble-forming gas into such ore pulp and disseminating such products and additional gas through the ore pulp so as to produce mineral-bearing froth, and separating the froth.

In testimony whereof, I have affixed my signature to this specification.

ELTOFT WRAY WILKINSON.